Patented Oct. 14, 1924.

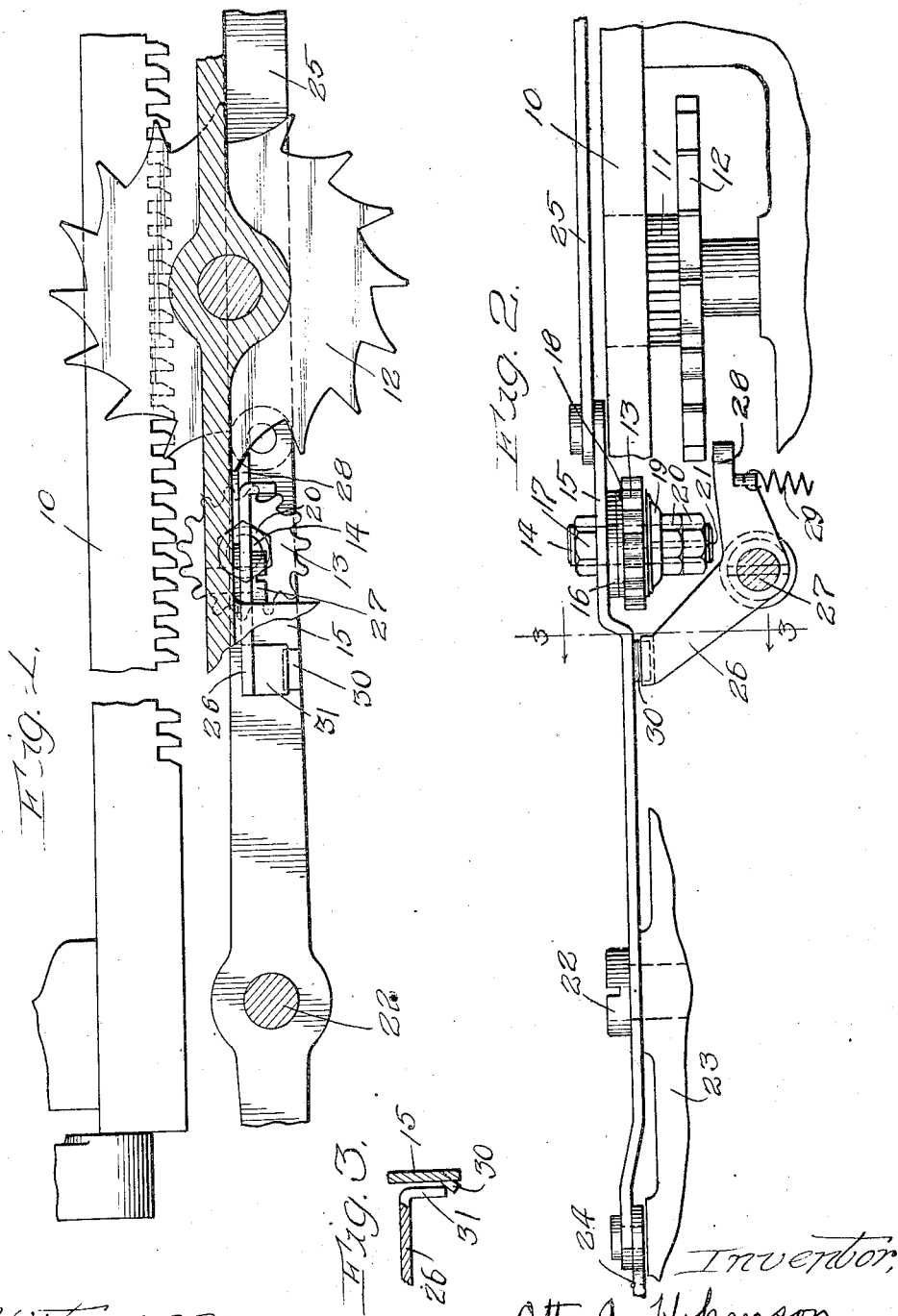

1,511,470

UNITED STATES PATENT OFFICE.

OTTO A. HOKANSON, OF WOODSTOCK, ILLINOIS, ASSIGNOR TO WOODSTOCK TYPEWRITER COMPANY, OF WOODSTOCK, ILLINOIS, A CORPORATION OF ILLINOIS.

CARRIAGE BRAKE FOR TYPEWRITERS.

Application filed January 12, 1920. Serial No. 351,024.

*To all whom it may concern:*

Be it known that I, OTTO A. HOKANSON, a citizen of the United States, residing at Woodstock, in the county of McHenry and State of Illinois, have invented certain new and useful Improvements in Carriage Brakes for Typewriters, of which the following is a specification.

This invention has for its object the provision of brake mechanism for the platen carriage of typewriters which shall be of improved construction and operation.

The invention is exemplified in the combination and arrangement of parts shown in the accompanying drawing and described in the following specification, and it is more particularly pointed out in the appended claims.

In the drawing—

Fig. 1 is a fragmentary elevation with parts in section showing one embodiment of the present invention;

Fig. 2 is a top plan view of the mechanism shown in Fig. 1; and

Fig. 3 is a fragmentary section illustrating a detail of construction.

In well-known typewriter construction a shiftable platen carriage is provided which is equipped with a spring for moving the carriage during the writing process and is generally provided with a rack and escapement wheel for controlling the movement under the tension of the spring. Such a rack is shown at 10 in the drawing which is arranged to mesh with a pinion 11 having an escapement wheel 12 secured thereto. The escapement wheel 12 is provided with the usual form of dogs, not shown in the drawing. In some operations it is desirable to free the rack 10 from the control of the escapement wheel 12 in order that a more extensive movement of the platen may be secured than that effected by an operation of the escapement wheel. The present invention contemplates such an effect by raising the rack 10 out of mesh with the pinion 11, thus leaving it free to move independently of the escapement wheel 12.

For lifting the rack a toothed wheel 13 is provided which is mounted on a stud 14 fixed to a lever arm 15 by means of a flange 16 and lock nut 17. A friction washer 18 is interposed between the wheel 13 and the flange 16 and a cup-shaped disc 19 of thin sheet spring material bears against the face of the wheel 13 opposite the washer 18. A pair of lock nuts 20 bear against the spring disc 19 to hold the disc in frictional engagement with the wheel 13. The disc 19 is preferably provided with a tongue which engages a slot 21 in the stud 14 to prevent rotation of the disc 19 and thus produce a frictional braking effect upon the wheel 13. The braking effect may be regulated by the lock nuts 20.

The lever arm 15 is pivoted at 22 to a portion of the typewriter frame 23 and is provided with a link 24 which connects the lever with an operating key, not shown. The lever arm 15 may also be connected with an arm 25 for controlling stop mechanism of any well-known form for arresting the movement of the rack 10, as is usual in tabulating operations. When the tabulating key is depressed the wheel 13 will be raised by the lever arm 15 into mesh with the teeth of the rack 10 and the rack will be lifted thereby out of mesh with the pinion 11, thus freeing the rack from the restraint of the escapement wheel. The rack will then move under the tension of its spring until checked by the tabulator stop mechanism which is brought into operation by the arm 25 at the same time that the wheel 13 is raised to release the rack from the escapement wheel. The movement of the rack while free from the escapement wheel will not be entirely unrestrained but will be controlled by the friction brake comprising the spring disc 19 and the friction washer 18 which bear against the wheel 13. The amount of resistance offered to the movement of the disc may be so regulated that it will travel with sufficient rapidity and yet will move smoothly and will be arrested without jarring, such as results when the rack is permitted to move freely until stopped by the tabulator stop mechanism.

The control mechanism for the escapement wheel 12 usually includes a spring-pressed dog which bears against the teeth of the escapement wheel and would ordinarily impart a partial reverse rotation to the escapement wheel when the wheel is freed from the rack 10. Such a reverse movement of the escapement wheel would interfere with proper engagement between the rack 10 and the pinion 11 when the rack is again lowered into mesh with the pinion. It is therefore desirable to prevent such reverse movement of the escapement wheel. This is accomplished in the form of the invention shown in the drawing by a bell crank lever 26 pivoted at 27 to the frame of the machine and provided with a tooth portion 28 arranged to move into the plane of the escapement wheel 12 and in the rear of one of the teeth of the escapement wheel. A spring 29 normally holds the tooth 28 out of mesh with the wheel 12, but the lever arm 15 is provided with a beveled projection 30, shown in detail in Fig. 3, which engages a downwardly bent portion 31 of the bell crank lever 26 when the arm 15 is raised to release the rack 10 from the pinion 11. The movement of the projection 30 in contact with the portion 31 of the bell crank lever 26 rotates the lever 26 in a counter-clockwise direction, as viewed in Fig. 2, and thus brings the tooth 28 into a position in the rear of one of the teeth of the escapement wheel 12 and thus prevents reverse rotation of the escapement wheel when the pinion 11 is freed from the rack 10. As long as the lever 15 is raised the projection 30 will bear against the face of the flange 31 on the bell crank lever 26 and thus hold the tooth 28 in its engaging position. As soon, however, as the lever 15 is restored to position to free the wheel 13 from the rack 10 and to return the rack into mesh with the pinion 11 the bell crank lever 26 will be returned to its inoperative position by the spring 29 and the tooth 28 will be moved out of the path of the teeth on the escapement wheel 12.

I claim:—

1. The combination with a typewriter carriage, of escapement mechanism therefor, means for freeing said carriage from the control of said escapement mechanism, a brake for said carriage, means for holding said escapement mechanism from displacement, and a common device for bringing said carriage freeing means, said brake, and said escapement holding means into operation.

2. The combination with a typewriter carriage, of a rack therefor, an escapement wheel having a pinion meshing with said rack, a toothed wheel movable into and out of engagement with said rack, a brake for said toothed wheel, means for preventing reverse rotation of said escapement mechanism, and a common operating device for moving said toothed wheel into engagement with said rack to lift said rack from said escapement pinion and for bringing said rotation preventing means into operative relation with said escapement mechanism.

3. In a typewriter construction, a platen carriage having a rack thereon, escapement mechanism for controlling the operation of said rack, an arm extending in the direction of the length of said rack, a stud shaft mounted on said arm and arranged transversely of said rack, a pinion on said stud shaft, a friction brake for controlling the rotation of said pinion, means for actuating said arm to move said stud shaft transversely of said rack to bring said pinion into engagement with said rack and thereby disengage said rack from said escapement mechanism so that said rack is free to rotate said pinion against the resistance of said brake.

4. Typewriting mechanism comprising an escapement wheel having a pinion thereon, a rack engaging said pinion and controlled thereby, a pivoted arm arranged substantially parallel with said rack, a stud shaft carried by said arm transversely of said rack and having a pinion thereon movable by said arm into and out of engagement with said rack, a spring disc arranged to bear against said pinion to provide a yielding friction brake therefor, means for adjusting the tension in said spring disc, said rack being movable by said last-mentioned pinion and arm out of engagement with said first-mentioned pinion, and means actuated by the movement of said arm for locking said escapement wheel against rotation when the pinion connected therewith is free from said rack.

In testimony whereof I have signed my name to this specification on this 8th day of January, A. D. 1920.

OTTO A. HOKANSON.